United States Patent [19]

Rainey

[11] Patent Number: 5,492,354
[45] Date of Patent: Feb. 20, 1996

[54] APPARATUS FOR MOUNTING AUXILIARY WHEELS ON BICYCLES

[76] Inventor: Charles D. Rainey, 709 10th St., Coronado, Calif. 92118-2802

[21] Appl. No.: 89,668

[22] Filed: Jul. 9, 1993

[51] Int. Cl.⁶ .................................................. B62H 1/12
[52] U.S. Cl. .......................... 280/293; 280/304; 280/701; 267/286
[58] Field of Search ................................. 280/293, 304, 280/296, 295, 298, 300, 303, 701, 670, 722; 180/209; 267/286; 446/466, 469

[56] References Cited

U.S. PATENT DOCUMENTS

| | | | |
|---|---|---|---|
| 2,450,979 | 10/1948 | Moller | 280/293 |
| 2,793,877 | 5/1957 | Meier, Jr. | 280/293 |
| 3,642,305 | 2/1972 | Pawsat | 280/293 |
| 4,133,402 | 1/1979 | Soo Hoo | 280/293 |
| 4,203,500 | 5/1980 | Kamiya | 280/293 |
| 4,595,213 | 6/1986 | Tsuchie | 280/293 |
| 4,810,000 | 3/1989 | Saunders | 280/293 |
| 5,064,213 | 11/1991 | Storch | 280/293 |
| 5,100,163 | 3/1992 | Egley et al. | 280/293 |

FOREIGN PATENT DOCUMENTS

| | | | |
|---|---|---|---|
| 0687358 | 8/1930 | France | 280/293 |
| 1265135 | 5/1961 | France | 446/469 |
| 0002432 | of 1896 | United Kingdom | 280/293 |
| 0782362 | 9/1957 | United Kingdom | 280/303 |
| 2037681 | 7/1980 | United Kingdom | 280/293 |

*Primary Examiner*—Ann Marie Boehler
*Attorney, Agent, or Firm*—Thomas J. Tighe

[57] ABSTRACT

An apparatus for mounting an auxiliary wheel on a bicycle wheel. A resiliently flexible arm, such as a coil spring, laterally spaces from a wheel of the bicycle a smaller auxiliary wheel. A pintle is connected to the arm at an end remote from the bicycle wheel for mounting the auxiliary wheel for rotation parallel to the rotation of the bicycle wheel. A shank is connected to an end of the resilient arm remote from the pintle for radially offsetting the arm downwardly from an axle of the bicycle wheel, and a bracket mechanism for coupling the shank to the frame at the axle to secure it in fixed relation to the bicycle wheel. Preferably the amount of radial offset can be adjusted to fit one size of the apparatus on at least two of the most popular sizes of children's bicycles, namely 12" and 16" (wheel diameter) bicycles. The radial adjustment can also be used to compensate for variations in tire depth and inflation. The resiliently flexible arm can be a coil spring longitudinally parallel with the pintle, and the pintle and shank are preferably linear extensions of opposite ends of the coil spring.

15 Claims, 1 Drawing Sheet

APPARATUS FOR MOUNTING AUXILIARY WHEELS ON BICYCLES

BACKGROUND OF THE INVENTION

This invention relates in general to apparatuses for mounting auxiliary wheels on bicycles, such as those generally used for training purposes. In particular, this invention relates to longitudinally resilient axles for mounting auxiliary wheels on opposite sides of a bicycle wheel for lateral stability.

For some background, training wheels are those wheels attached to the rear axle of a bicycle to provide it with vertical stability. They are especially used to help small children learn how to ride bicycles. Conventional rigid auxiliary axles extend laterally from the back wheel, usually attached to the rear wheel axle by some bracket means, with small wheels are mounted thereon. These wheels are typically not flush with the bottom of the bicycle's rear wheel so that when the bicycle is moving, it is riding on its normal two wheels. The side wheels only come into play when the bicycle is laterally tilted.

The proper way to turn a bicycle is to lean into the turn rather than twist the front wheel in a new direction. In order for conventional, rigid axle training wheels to allow for leaning into turns, the bottom of the wheels must be spaced above the bottom of the bicycle's rear wheel. This, however causes another problem because if the child leans too far and the bicycle comes to rest on one of the training wheels, the child may not have enough weight and/or strength to right the bicycle and will thereafter be locked into a continuous turn.

Others have devised complicated solutions to this problem.

U.S. Pat. No. 2,450,979 by Moller describes a set of training wheels on axles that are spring loaded and that can rotate vertically within a limited range. The training wheels are shown to be flush with the bottom of the back wheel and Moller describes the invention as permitting the natural tendency of a rider to lean or bank inwardly when making a turn. The spring loading is accomplished by coiled springs at what appears to be a 45° angle and the axles are attached to the back wheel axle by L-shaped brackets.

U.S. Pat. No. 4,133,402 by Soo Hoo describes a pair of training wheels or stabilizing wheels for motorcycles. The side wheels are attached by pairs of strut rods in a pivotal arrangement so that as the back wheel tilts, the inside stabilizing wheel tilts at the same angle to avoid skidding.

U.S. Pat. No. 2,793,877 by Meier, Jr. describes another set of training wheels attached to the back wheel axle by L-shaped brackets. The axles of the training wheels are each attached to a flat or leaf spring that is bent in generally an L-shape, however the memory of the springs tends to straighten them out. Thus, as a rider banks into a turn, the inside axle rotates upward to a limit and the outside axle due to the spring's memory rotates downward keeping it in contact with the ground.

U.S. Pat. No. 4,203,500 by Kamiya describes a motorcycle with wings extending from opposite sides having raised wheels at the wing tips. They are not really wings but rather pivotally attached strut pairs. As a motor cycle banks into a turn, the wheels come into contact with the ground and assume an angle counter to the angle to the motorcycle to prevent the motorcycle from turning over.

U.S. Pat. No. 4,595,213 by Tsuchie describes another pair of training wheels for bicycles attached by generally L-shaped brackets. The wheel axles are vertically rotatable and spring biased by vertical coil springs. FIG. 4 illustrates their action when the bicycle banks into a turn. This is very similar to the Moller patent except that the coil springs are vertical rather than angled.

U.S. Pat. No. 4,810,000 by Saunders describes another pair of bicycle training wheels basically supported by brackets attached to the rear axle of the bicycle. In this case, the wheels are pivotally connected by respective arms to rotate in a plane parallel to the plane of the rear wheel. The pivoting of the training wheels is controlled by respective cables attached to the front wheel fork. When the front wheel is pointed straight ahead, the training wheels are flushed with the bottom of the bicycle rear wheel, however if the front wheel is turned to the right or the left the mechanical motion of the turn is communicated to the pivot arms of the training wheels via the cable causing the inside wheel to pivot upward and the outside wheel to pivot downward thereby keeping both in contact with the ground.

U.S. Pat. No. 5,064,213 by Storch describes another pair of training wheels for bicycles. These are again attached to the rear axle by generally an L-shaped bracket and they are flush with the bottom of the rear wheel. They are also spring biased by coil springs at an angle. It appears that in the normal upright position, the coil springs are somewhat compressed so that when the bicycle leans into a turn, the inside spring is compressed further by upward rotation of the inside wheel axle and the outside spring expands causing the downward rotation of the outside wheel's axle keeping both in ground contact.

U.S. Pat. No. 5,100,163 by Egley et al. describes another pair of training wheels very similar to Storch with the addition of a means for adjusting the tension on the coil springs and a limiter which sets the limit that the axles can rotate upward. FIG. 3 shows this limiter to be adjustable.

These prior art references all disclose very complicated and costly devices to overcome the drawbacks of rigid auxiliary axles, whereas this invention presents a simple yet most effective way to accomplish the same end.

Other advantages and attributes of this invention will be readily discernable upon a reading of the text hereinafter.

SUMMARY OF THE INVENTION

An object of this invention is to provide training wheels for bicycles which permit a rider to lean the bicycle into a turn in a more natural way but yet will provide lateral stability to prevent the bicycle from falling over.

A further object of this invention is to provide training wheels for bicycles which when the bicycle is upright are in contact with the surface upon which the bicycle is resting, but nevertheless will permit a rider to lean the bicycle to a safe extent during turns.

These and other objects, which will be apparent upon a reading of the text hereinafter, are accomplished by an apparatus for mounting an auxiliary wheel on a bicycle wheel having a resiliently flexible arm for laterally spacing from a wheel of the bicycle a smaller auxiliary wheel, a pintle connected to the arm at an end remote from the bicycle wheel for mounting the auxiliary wheel for rotation parallel to the rotation of the bicycle wheel, a shank connected to an end of the resilient arm remote from the pintle for radially offsetting the arm downwardly from an axle of the bicycle wheel, and a bracket connected to the shank for mounting the shank at the axle of the bicycle wheel. Preferably the amount of radial offset can be adjusted to fit one size of the apparatus on at least two of the most popular sizes of children's bicycles, namely 12" and 16" (wheel diameter) bicycles. The radial adjustment can also be used to compensate for variations in tire depth and inflation, and to be raised above the bicycle wheel to provide minimal lateral support. The resiliently flexible arm is preferably a coil spring longitudinally parallel with the pintle, and the pintle and shank are preferably linear extensions of opposite ends of the coil spring.

DESCRIPTION OF THE PREFERRED EMBODIMENT

Figure 1:
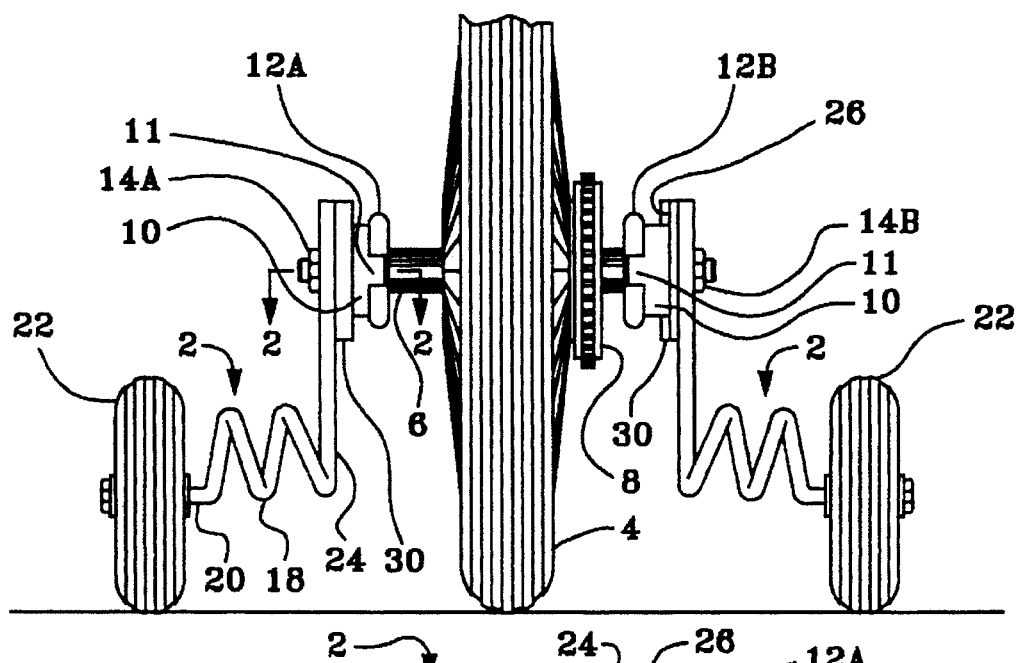
FIG. 1 is a partial end view of a bicycle with the auxiliary wheels according to this invention mounted thereon.
Figure 2:
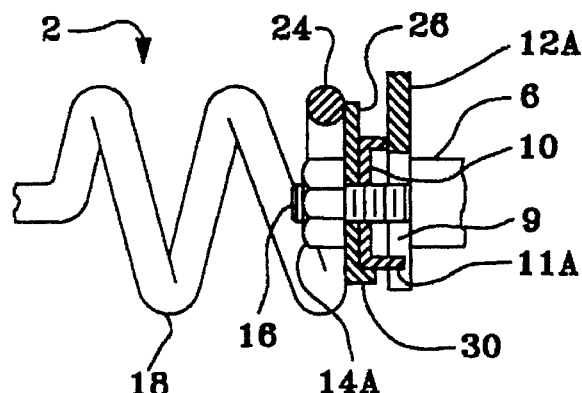
FIG. 2 is a sectional view taken along line 2—2 of FIG. 1.
Figure 3:
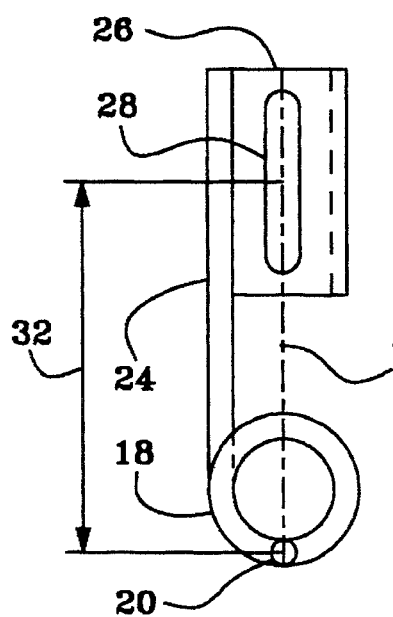
FIG. 3 is a front elevational view of an auxiliary axle, without a mounted wheel, according to this invention.
Figure 4:
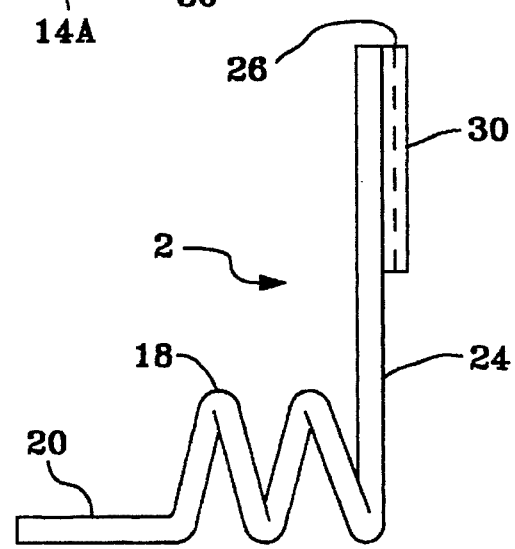
FIG. 4 is a side elevational view of an auxiliary axle, without a mounted wheel, according to this invention.

Referring to FIGS. 1 and 2, illustrated are two auxiliary axles according to this invention, one mounted on the left side of a bicycle (as referenced to a seated rider) and one mounted on the right side, both generally designated 2. Illustrated in conjunction therewith is the rear wheel 4 of a bicycle having an axle 6 and drive sprocket 8. The rear wheel axle is affixed to and supported at opposite ends by two tines, 12A and 12B, of a rear fork of the bicycle. Conventionally, the tines each have a slot 9 open to the rear into which a threaded end (e.g. 16 of FIG. 2) of the wheel axle is inserted and bolted therein by means of nuts, 14A and 14B.

Referring to all the figures, the auxiliary axle 2 has a resiliently flexible arm illustrated as a coil spring 18 having a longitudinal axis. Connected to one end of the spring is a pintle 20 on which a wheel 22 is mounted by conventional means for rotation. Preferably, the pintle is an integral extension of an end of the spring and extends parallel to the axis of the spring. The other end of the coiled spring is connected to an elongated shank 24 which is illustrated as an integral extension of an end of the spring which projects generally vertical from the spring. Preferably the longitudinal axis of the shank is normal to the longitudinal axis of both the pintle and the spring but does not necessarily intersect same. Affixed, as by welding or other conventional means, to an end of the shank remote from the spring is a mounting bracket illustrated as a rectangular plate 26 which defines an elongated slot 28 which is longitudinally aligned with the pintle 20, as illustrated by dashed line 29. As illustrated the shank 24 is affixed to the bracket plate 26 along one margin on one face of the plate, and on the opposite face along the opposite margin is a right-angle flange 30.

Referring to FIGS. 1 and 2, the auxiliary axle 2 on the left side is mounted by removing the nut 14A from the threaded end 16 of the wheel axle 6 and mounting the bracket plate 26 on said threaded end by passing the threaded end through the bracket slot 28 and reapplying the nut 14A. Interposed between the rear fork tine 12A and the bracket plate is a conventional style key 10 for preventing rotation of the bracket plate about the axle end 16. As illustrated, the key has a flat rectangular base, for frictionally engaging the bracket plate, and parallel generally right-angled flanges extending from opposite margins of the base for forming shoulders against which the right-angle flanges of the bracket plates abut. A tab 11 extends from one of the key's flanges to project into a rear fork tine slot (e.g. slot 9 of FIG. 2); the tab keeps the key from rotating and the key keeps the bracket plate from rotating. In this way, the bracket plate is clamped against the key and the key is clamped against the rear fork tine 12A.

As explained, the pintles of the auxiliary axles are aligned with the bracket plate slots. Thus when mounted, the pintles are radially aligned with the rear wheel axle and extend laterally parallel thereto, except when the resilient arm is flexed. Also preferably, the pintles align with the lower extremities of their respective coiled springs. As illustrated, the shanks extend tangentially from their respective coiled springs to offset the connections between the shanks and their bracket plates from the bracket slots.

The coiled spring segments are preferably heavy duty and require a great deal of force to bend, but nevertheless will suitably flex under the weight of a rider during a turn. Flexing is suitable if it permits the rider to lean the bicycle into a turn in order to learn the technique but not to such an extent that the bicycle becomes laterally unstable and falls over.

Preferably the size of the brackets and the slots 28 defined by the brackets are dimensioned to adjust the radial offset sufficiently to allow use of a one size of the invention on at least two of the most common bicycle sizes for small children, e.g. bicycles with twelve and sixteen inch diameter wheels. As an example, an apparatus having a vertical dimension of 4½ inches from the axis of the pintle 20 to a center of the slot 28, as illustrated by arrow 32, a slot length of 2⅜ inches, and a 4½ inch diameter auxiliary wheel would fit both bicycle sizes. The slot also allows for fine tuning the height of auxiliary wheel to compensate for variations in tire depth and tire inflation. Also, the slots can be additionally sized to permit raising of the auxiliary wheels above the bottom of the bicycle wheel to provide minimal lateral support in order to wean the child from reliance on the auxiliary wheels.

A significant advantage of the flexible auxiliary axles of this invention is that the wheels can sit flush with the rear bicycle wheel and still permit a child to lean into a turn. During a turn, the inside training wheel axle will simply bend upward to accommodate leaning, and the memory of the inside spring will actually assist the child in righting the bicycle after completion of the turn. When the bicycle is back in a vertical orientation, the counter balancing force of the inside spring will be gone. Thus the springs tend to keep the bicycle upright, but do permit a rider to lean the bicycle into a turn which is what a rider would typically do if there were no prohibiting training wheels.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims. For example, the apparatus illustrated in the drawings is in only one form which can nevertheless be mounted on both sides of the wheel since the key 10 has shoulders on opposite sides of the bicycle wheel axle. This provides a shoulder against which a right-angle flange 30 can abut regardless of which side of the bicycle the apparatus is mounted. However, as an alternative embodiment the apparatus could be provided in pairs in which one pair member is the mirror image of the other member so that when a pair is mounted on a bicycle the right-angle flanges are on a common side of the axle.

I claim:

1. An apparatus for mounting an auxiliary wheel on a bicycle comprising:
   (a) a coil spring member, having a long axis, for laterally spacing from a wheel of the bicycle a smaller auxiliary wheel, the coil spring member being oriented to flex, during normal use of the bicycle, transverse to the long axis,
   (b) pintle means, connected to the coil spring member at an end remote from the bicycle wheel, for mounting the auxiliary wheel for rotation parallel to the rotation of the bicycle wheel,
   (c) shank means, connected to an end of the coil spring member remote from the pintle means, for radially offsetting the coil spring member downwardly from an axle of the bicycle wheel, and
   (d) means for coupling the shank means to a frame of the bicycle at the axle in fixed relation to the bicycle wheel.

2. The apparatus according to claim 1 further comprising means for adjusting the amount by which the coil spring member is radially offset.

3. The apparatus according to claim 2 wherein the pintle means comprises a linear extension of an end of the coil spring member remote from the bicycle wheel.

4. The apparatus according to claim 3 wherein the shank means comprises a linear extension of an end of the coil spring member proximate the bicycle wheel.

5. The apparatus according to claim 2 wherein the shank means comprises a linear extension of an end of the coil spring member proximate the bicycle wheel.

6. The apparatus according to claim 1 wherein the pintle means comprises a linear extension of an end of the coil spring member remote from the bicycle wheel.

7. The apparatus according to claim 6 wherein the shank means comprises a linear extension of an end of the coil spring member proximate the bicycle wheel.

8. The apparatus according to claim 1 wherein the shank means comprises a linear extension of an end of the coil spring member proximate the bicycle wheel.

9. The apparatus according to claim 1 further comprising means for adjusting the amount by which the coil spring member is radially offset sufficiently to permit one size of the apparatus to fit at least two sizes of bicycles.

10. The apparatus according to claim 9 wherein the pintle means comprises a linear extension of an end of the coil spring member remote from the bicycle wheel.

11. The apparatus according to claim 10 wherein the shank means comprises a linear extension of an end of the coil spring member proximate the bicycle wheel.

12. The apparatus according to claim 9 wherein the shank means comprises a linear extension of an end of the coil spring member proximate the bicycle wheel.

13. The apparatus according to claim 1 wherein the means for coupling comprises:
    (a) a hole defined by the shank means for receiving therethrough an end of a wheel axle,
    (b) means, connectable to the end of the wheel axle, for affix the shank means to the frame, and
    (c) means for preventing rotation of the shank means about the wheel axle.

14. The apparatus according to claim 1 wherein the means for coupling comprises:
    (a) a mounting bracket connected to the shank means,
    (b) a hole defined by the mounting bracket for receiving therethrough an end of a wheel axle,
    (c) means, connectable to the end of the wheel axle, for affixing the mounting bracket to the frame, and
    (d) means for preventing rotation of the shank means about the wheel axle.

15. The apparatus according to claim 14 wherein the means for preventing rotation of the shank means comprises:
    (a) a shoulder defined by the mounting bracket,
    (b) key means for abuttingly engaging the mounting bracket shoulder to hold the mounting bracket in fixed relation to the key means, and
    (c) tab means, projecting from the key means, for extending into a bicycle frame axle slot and thereby preventing rotation of the key means about the axle.

* * * * *